United States Patent [19]

Eastman

[11] 4,196,504
[45] Apr. 8, 1980

[54] TUNNEL WICK HEAT PIPES
[75] Inventor: George Y. Eastman, Lancaster, Pa.
[73] Assignee: Thermacore, Inc., Leola, Pa.
[21] Appl. No.: 929,945
[22] Filed: Jul. 31, 1978

Related U.S. Application Data
[62] Division of Ser. No. 785,122, Apr. 6, 1977, abandoned.
[51] Int. Cl.² ...................... B23P 15/26; F28D 15/00
[52] U.S. Cl. .................... 29/157.3 R; 165/105;
29/423; 29/420; 29/DIG. 8; 165/DIG. 10
[58] Field of Search .................. 29/157.3 R, 423, 420;
165/105, DIG. 8, DIG. 9, DIG. 10

[56] References Cited
U.S. PATENT DOCUMENTS

| | | | |
|---|---|---|---|
| 3,334,400 | 8/1967 | Jaeger | 29/157.3 R |
| 3,498,371 | 3/1970 | Zygiel | 165/164 |
| 3,681,843 | 8/1972 | Arcella et al. | 29/157.3 R |
| 3,786,861 | 1/1974 | Eggers | 165/105 |
| 3,844,342 | 10/1974 | Eninger et al. | 165/105 |
| 3,911,547 | 10/1975 | Vinz | 29/157.3 R |

OTHER PUBLICATIONS
Basillis; A., *What Good is the Heat Pipe*, Chemtech, Mar. 1976, pp. 208–211.

*Primary Examiner*—Francis S. Husar
*Assistant Examiner*—V. Rising
*Attorney, Agent, or Firm*—Martin Fruitman

[57] ABSTRACT

A high performance heat pipe and the method for constructing it. A unique wick structure of sintered metal is formed directly into the heat pipe casing and contains simultaneously formed tunnels which permit the flow of large quantities of liquid with low pressure loss. A method of constructing a hybrid structure with heat pipe sections at both ends of a section used to transport the internal liquid and vapor over long distances is also included.

5 Claims, 9 Drawing Figures

TUNNEL WICK HEAT PIPES

This is a division of application Ser. No. 785,122 filed Apr. 6, 1977, now abandoned.

BACKGROUND OF THE INVENTION

The heat pipe is a sealed element in which heat is transferred by evaporation, vapor movement and condensation. The condensate is then returned to the evaporator by capillary action in a wick. The first such devices used homogeneous wick structures of uniform cross section and porosity. The heat transfer rate in these heat pipes was limited by the high viscous drag due to liquid flow through the small, convoluted passages in the wick. It was subsequently shown that greater heat transfer over greater heat pipe lengths could be obtained through the use of a composite wick having a controlled inhomogeneity. Structures having wicks which cover grooves, slabs, and arteries cut into the casing have been demonstrated. These composite wicks have a small pore surface at the liquid/vapor interface in the evaporator region, liquid passages of large cross section and minimum convolution through all or most of the length of the heat pipe from condenser to evaporator. The small pores provide high capillary pressures for maximum pumping. The large, longitudinal passages permit the flow of large quantities of liquid with low pressure loss.

The highest axial power density reported to date has been obtained with a composite wick consisting of longitudinal grooves covered with woven screen having 508×3600 wires per inch. The grooves were reported as 0.06×0.05 cm, the screen wire diameters as 0.0025 cm and 0.0015 cm respectively, and the effective pore size as 0.0011 cm. Two layers of screen were used so that the apparent thickness of the screen wick was that of two warp wires plus two woof wires, or 0.008 cm (0.003"). For proper utilization of the pumping pressure afforded by the very fine pore screen, the liquid/vapor interface in the evaporator must fall within the screen. Since the two layers of screen are very thin, the tolerance on liquid level is only 0.008 cm. All variation due to gravitational orientation, liquid inventory, power level and thermal expansion of the liquid must cause a change in liquid level of less than 0.008 cm, an extremely difficult control task to manage in quantity production. Moreover, it has proven difficult to produce longitudinal grooves in the inside walls of refractory metals such as molybdenum and tungsten. This difficulty has prevented the extension of this high performance construction technique to high temperature heat pipes such as might be used for thermionic out-of-core nuclear space power systems.

Although small pore size heat pipe wicks have also been constructed using the sintering of copper and nickel powders, such wicks were of the homogeneous type and not suited for long liquid flow paths, because of the high liquid flow pressure loss through the small pores. Such wicks have limited liquid flow lengths and thus limit the working length of the heat pipe to only about one-half inch.

SUMMARY OF THE INVENTION

This invention relates generally to heat pipes and more specifically to high performance heat pipes with a composite wick fabricated from metal powder and containing integral liquid flow tunnels and the method for fabricating such heat pipes. Sintered metal powder wicks can be produced with very small pores yielding high capillary pressures.

Sintered metal powder wicks also have excellent thermal conductivity and, when sintered to the heat pipe casing, provide a good heat flow path to the evaporation surface within the heat pipe. This reduces superheating of the liquid in the evaporator and permits high evaporative power densities, a factor of importance when dealing with compact heat sources such as nuclear reactors. However, the sintered wicks have very tortuous, small area liquid flow paths which lead to high pressure requirements, which, in turn, offset the increased pressure capability. Thus, sintered metal wicks are not widely used.

The present invention provides a means of distributing liquid freely within a sintered metal wick, thereby making possible the delivery of the full power potential of this structure. One or more continuous, longitudinal holes or tunnels are formed within the wick simultaneous with its formation to provide liquid flow passages of low viscous drag. Liquid returning from the condenser flows preferentially in these tunnels until it reaches the evaporator area. It then flows laterally through the sintered metal powder to the evaporation surface, a distance of 0.02–1". For proper wick operation and tunnel filling or priming, the tunnels must be closed at the ends, as is well known in the heat pipe art.

Thickness of the tunneled sintered wick is an independent function, not related in any way to other construction parameters. This permits an added degree of freedom of design. Unlike the heat pipe built with screening, the pore size of the tunneled sintered wick is independent of wick thickness, and the critical aspect of liquid filling is eliminated by simply making the thickness of the wick great enough to accommodate all anticipated variations in liquid-vapor interface.

The heat pipes of the present invention are constructed by sintering the cylindrical portion of the wick in place within the heat pipe casing. Longitudinal liquid flow tunnels are formed during this process by placing non-adhering rods within the sintering form and thus constructing the tunnels during the sintering process. Two end discs sized to cover the open ends of the formed tunnels are separately formed of sintered metal. The cylindrical section is then attached to the end discs by a second sintering process in which a paste formed of sintered metal is used as filler and cement to bond the previously sintered parts together. The resulting assembly is a homogeneous sintered metal, closed end cylinder with closed end tunnels formed within only the cylindrical wall section.

In some applications, there exists such very long distance between a heat source and the device to be heated that it is economically impractical to use a heat pipe for the entire length. In an application such as might be anticipated for an aircraft, the efficient transfer of heat could be required for fifty or more feet. The construction of a true heat pipe of that length would be quite difficult, but actually, for the greater part of such a distance, true heat pipe operation is not required so that a simple structure for interchanging liquid and vapor such as a pipe will actually function quite well.

The present invention includes a method of constructing such a "hybrid" heat pipe. The method essentially involves placing a pipe structure between two sintered end sections of wick before the sintering process takes place. The sintering process then bonds the wick to the pipe structure to form a section which transports liquid and vapor from one wick end to the other while keeping the liquid and vapor isolated. Such a structure can be built of tubing in such a manner that bending the hybrid heat pipe during installation causes no difficulty in operation. To accomplish this, it is only necessary to be certain that the bends are made in the portion which does not contain the sintered wick.

DETAILED DESCRIPTION OF THE INVENTION

Figure 1:
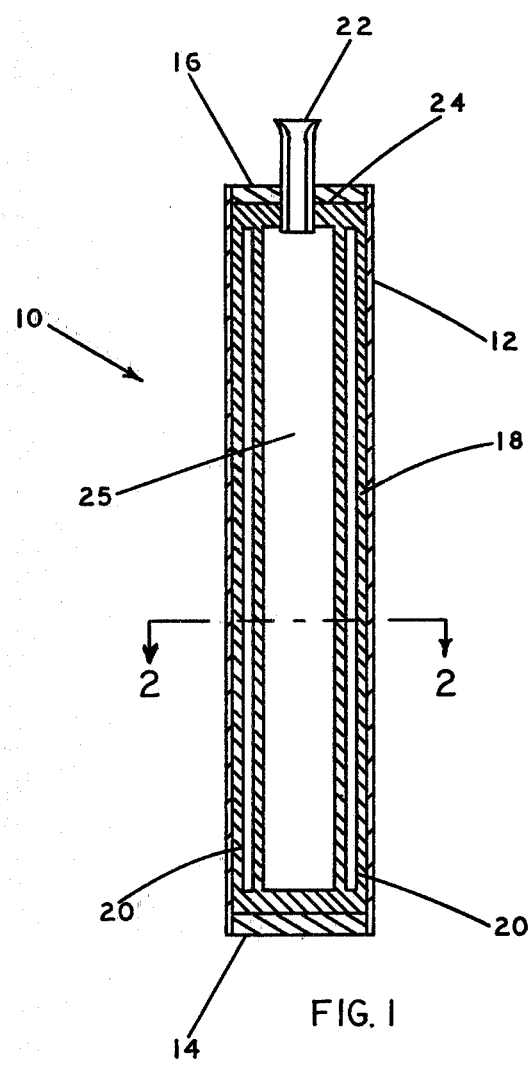
FIG. 1 is a longitudinal cross-sectional view of a preferred embodiment of a heat pipe constructed according to the present invention.
Figure 2:
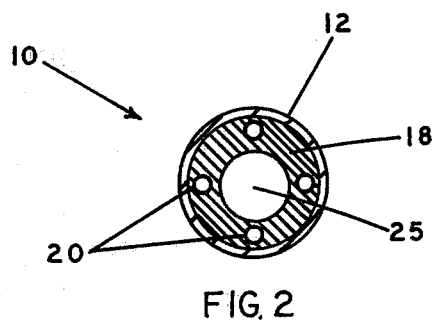
FIG. 2 is a sectional view at line 2—2 of the heat pipe shown in FIG. 1.

The preferred embodiment of the invention is shown in FIG. 1 and FIG. 2, where FIG. 2 is a sectional view of heat pipe 10 taken at section 2—2. Heat pipe 10 is constructed of cylindrical outer casing 12, casing end caps 14 and 16, and sintered metal wick 18. Longitudinal liquid flow tunnels 20 are formed integral with wick 18. Fill tube-closure 22 is positioned to pierce both end cap 16 and the end disc 24 of wick 18 so that vapor space 25 of the heat pipe can be pumped free of air and loaded with the appropriate liquid for operation.

Figure 3:
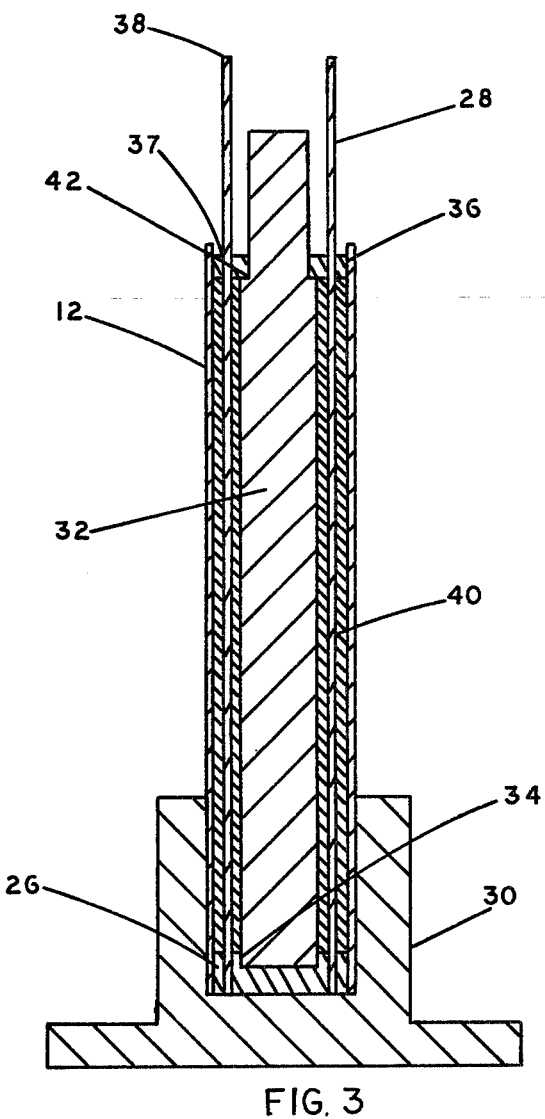
FIG. 3 is a cross-sectional view of one apparatus used in the process of constructing the cylindrical section of the heat pipe of FIG. 1.

The process of forming the tunnel wick heat pipe is described in conjunction with FIG. 3. As shown in FIG. 3, lower guide ring 26, tunnel-forming rods 28 and outer casing 12 are inserted in fixture base 30. Vapor space mandrel 32 is then inserted into indexing hole 34 in lower guide ring 26. Upper guide ring 36 is placed with its holes 37 over the upper ends 38 of tunnel-forming rods 28, but it is held some distance above the top of outer casing 12. Metal powder 40 of appropriate composition and particle size is poured into the annular cavity formed between the inside of outer casing 12 and vapor space mandrel 32. The assembly is gently agitated to settle powder 40 around tunnel-forming rods 28 and eliminate voids. More powder is added as needed, followed by further agitation. When the powder reaches the desired level, marked by shoulder 42 on vapor space mandrel 32, upper guide ring 36 is lowered until it seats on mandrel shoulder 42, as shown in FIG. 3. The assembly is then fired in a furnace for appropriate time and temperature and in the appropriate atmosphere to sinter the grains of powder to form the cylindrical portion of wick 18 as shown in FIG. 1.

Upon cooling, the fixtures and tunnel forming rods are removed leaving a free-standing, cylindrical open-ended tunnel wick structure, diffusion bonded to the inner wall of the heat pipe casing.

A representative heat pipe, intended for use with water as the working fluid, can be formed from AMAX Type B copper powder (American Metals Climax) in an oxygen-free copper casing. The fixtures can be made from 18-8 stainless steel previously oxidized to prevent sticking to the copper powder during firing. A typical firing schedule which will provide a 40–70% sintered density is 900° C. for one hour in hydrogen of dew point 60°–80° F. The high humidity level of the hydrogen serves to sustain the protective oxide on the fixtures. Ceramic fixtures can serve as alternates and are particularly appropriate with refractory metal heat pipes which have lower thermal expansion rates and higher melting points than stainless steel. When ceramic fixtures are used, hydrogen humidification may be unnecessary. The fixtures are sized to slip fit at the furnace temperature. Contraction during sintering is such as to leave the parts loose for removal at room temperature. A slight taper of 0.001" per foot of mandrel length facilitates mandrel withdrawal.

Figure 4:
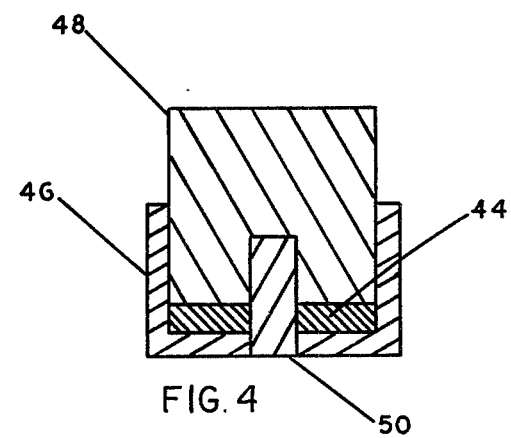
FIG. 4 is a cross sectional view of an apparatus used in the process of constructing the end discs of the heat pipe of FIG. 1.

As shown in FIG. 4, end disc 24 of wick 18 is similarly formed by placing metal powder 44 in base 46 and placing weight 48 to form the disc. Pin 50 is used to permit placing fill tube-closure 22 in end disc 24, but is eliminated for the blank end disc of the other end of the wick.

Figure 5:
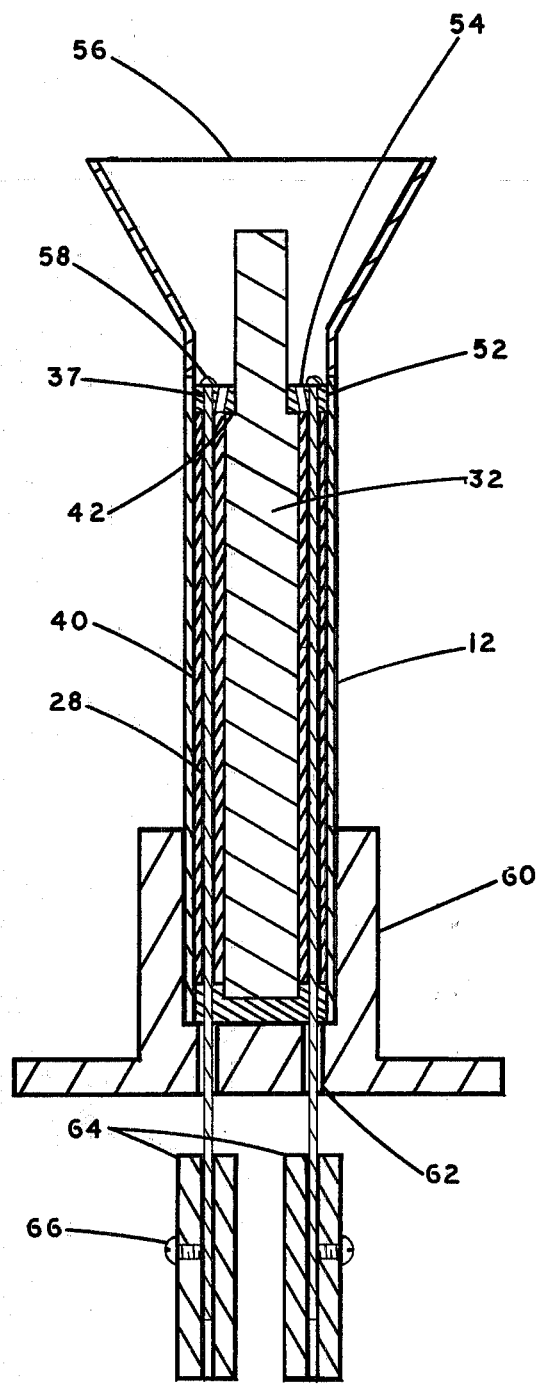
FIG. 5 is a cross-sectional view of another apparatus used in the process of constructing the cylindrical section of the heat pipe of FIG. 1.

For long heat pipes, the tunnel-forming rods may be difficult to keep straight. There is a consequent danger that the tunnel walls will be too thin. In such a case, the apparatus of FIG. 5 is used in the forming process. The fixture is similar to that of FIG. 3, except that upper guide ring 52 is placed on shoulder 42 of vapor space mandrel 32 prior to adding metal powder. Upper guide ring 52 is provided with additional holes 54 through which metal powder 40 flows from the funnel 56. Enlarged heads 58 are formed on the tunnel-forming rods 28 to prevent their slipping through the holes 37 in upper guide ring 52. Tunnel forming rods 28 extend through the bottom of fixture base 60 through holes 62. Weights 64 are attached to tunnel-forming 28 rods to pull them straight and are held by set screws 66. Metal powder 40 is then added as before and the assembly fired at the same time, temperature and atmosphere.

Figure 6:
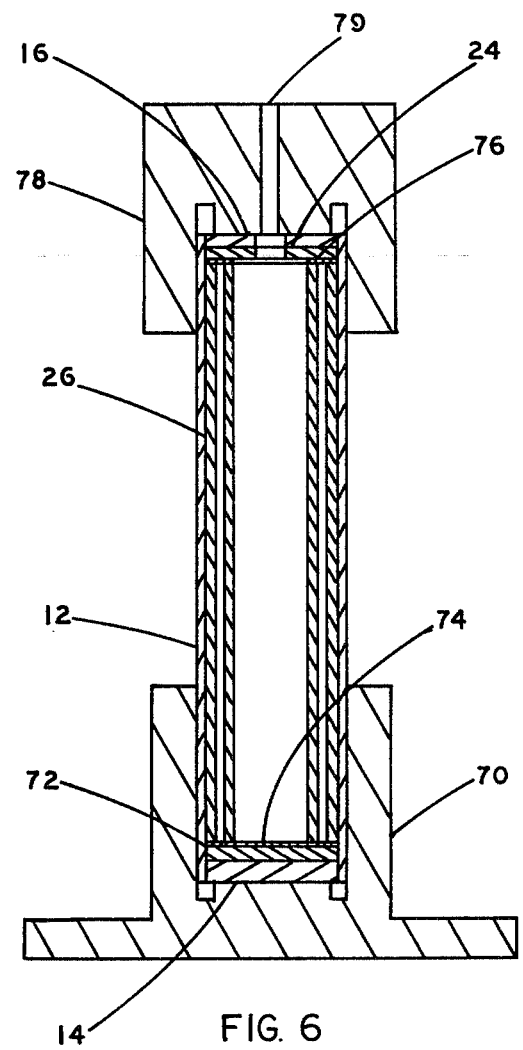
FIG. 6 is a cross-sectional view of the apparatus used in assembling the several sections of the heat pipe of FIG. 1.

Following the sintering of the cylindrical portion of the wick with tunnels to the casing inner wall, the tunnel ends must be closed. As shown in FIG. 6, blank end cap 14 is placed in fixture base 70 followed by blank end disc 72 previously prepared. A thin layer 74 of the same metal powder used to form the cylindrical wick and end discs is then spread on top of blank end disc 72 to form a continuous layer. A representative thickness is 0.010 to 0.020 inch. Heat pipe casing 12, with wick and tunnels previously sintered in place, is set so that the cylindrical portion of the wick rests on top of layer 74 of metal powder. A similar layer 76 of powder is placed on top of the tunnel wick 26. If excessive quantities of powder are lost into the tunnels, a slurry can be made of the metal powder and Nicrobraz Cement (Wall Colmonoy Co.) and this painted on the top of the tunnel wick. Fill tube end disc 24, closure end cap 16, and weight 78 with vent 79 are then put in place. The assembly is fired at the same conditions of time, temperature and atmosphere used in forming the tunnels. After cooling, the fixtures are removed, fill tube 22 inserted, and fill tube 22, end caps 14 and 16, and outer casing 12 joined by methods well known to practitioners of the heat pipe art. Heat pipe 10 is then given its fluid charge, evacuated of gas, sealed and is ready for use.

Figure 8:
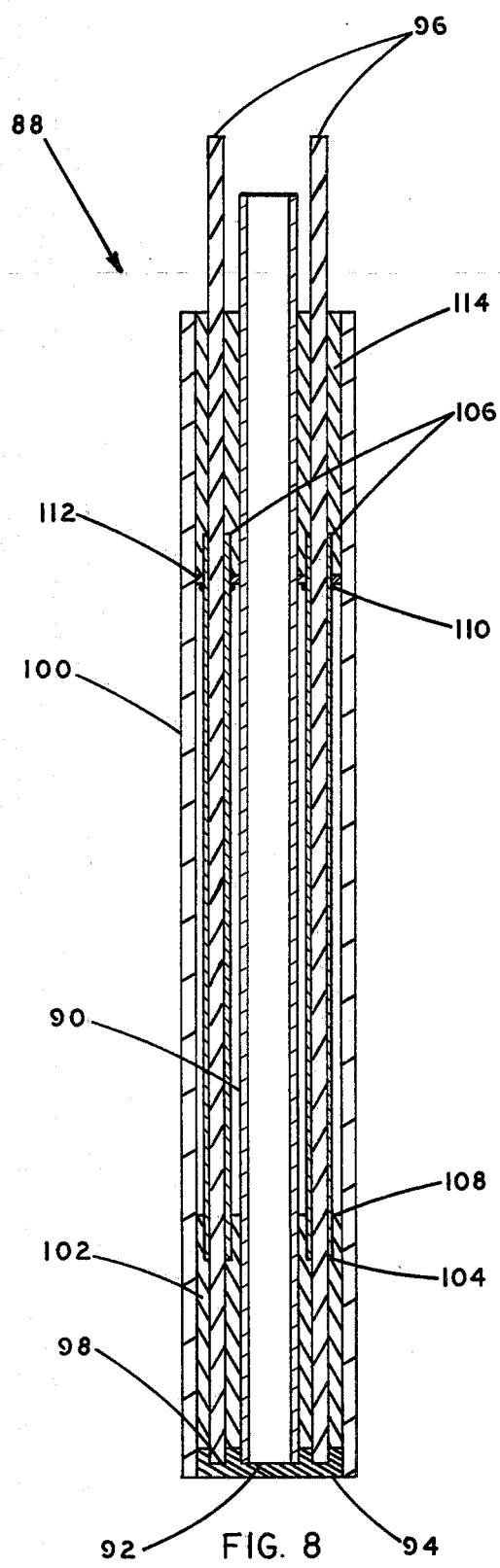
FIG. 8 is a cross-sectional view of one means of constructing a hybrid heat pipe which joins sections with sintered wick and a section without wick.

FIG. 8 shows assembly 88 for constructing a hybrid heat pipe, which has true operational heat pipes with sintered wicks only at the ends. These ends can be very remote from each other, as much as fifty feet or more.

In FIG. 8, vapor space mandrel 90 is placed in index recess 92 of end cap 94. Vapor space mandrel 90 is shown here as tubing because of the greater ease of securing long lengths of tubing as opposed to rod. Likewise, tunnel mandrels 96 are placed in index holes 98 of end cap 94. This self-jigging feature eliminates the need for special fixtures, such as lower guide ring 26 shown in FIG. 3. End cap 94 is then slipped into outer casing 100 and temporarily held in place by conventional means, such as clamps or fixtures (not shown). This forms a container into which sintering powder 102 is poured. The sintering powder is added while slightly agitating the assembly until level 104 is reached, which is slightly below the length of active heat pipe desired. Liquid conduits 106 are then slipped over tunnel mandrels 96 until the liquid conduits rest on metal powder 102. Metal powder is then added to raise the height of powder to level 108, sufficient to hold liquid conduits 106 in place after the powder is sintered.

Near the other end of the hybrid heat pipe, liquid conduits 106 have, attached to their outer surface, shoulders 110 upon which is rested powder retaining disc 112, after it is slid over the several mandrels as they protrude from outer casing 100. Powder retaining disc 112 then supports more sintering powder 114 which is poured into the cavity formed by outer casing 100, vapor space mandrel 90 and powder retaining disc 112.

Once assembled in this manner, assembly 88 is heated as described previously to sinter the powder and to form a two-part sintered wick bonded to outer casing 100. When vapor space mandrel 90 and tunnel mandrels 96 are withdrawn and the heat pipe completed as previously described, liquid conduits 106 remain embedded between the sintered wicks, and a continuous liquid transfer path is available between the wicks. This path is completely isolated from the vapor space and thus still permits the hybrid heat pipe to efficiently transfer heat from one end to the other.

Figure 9:
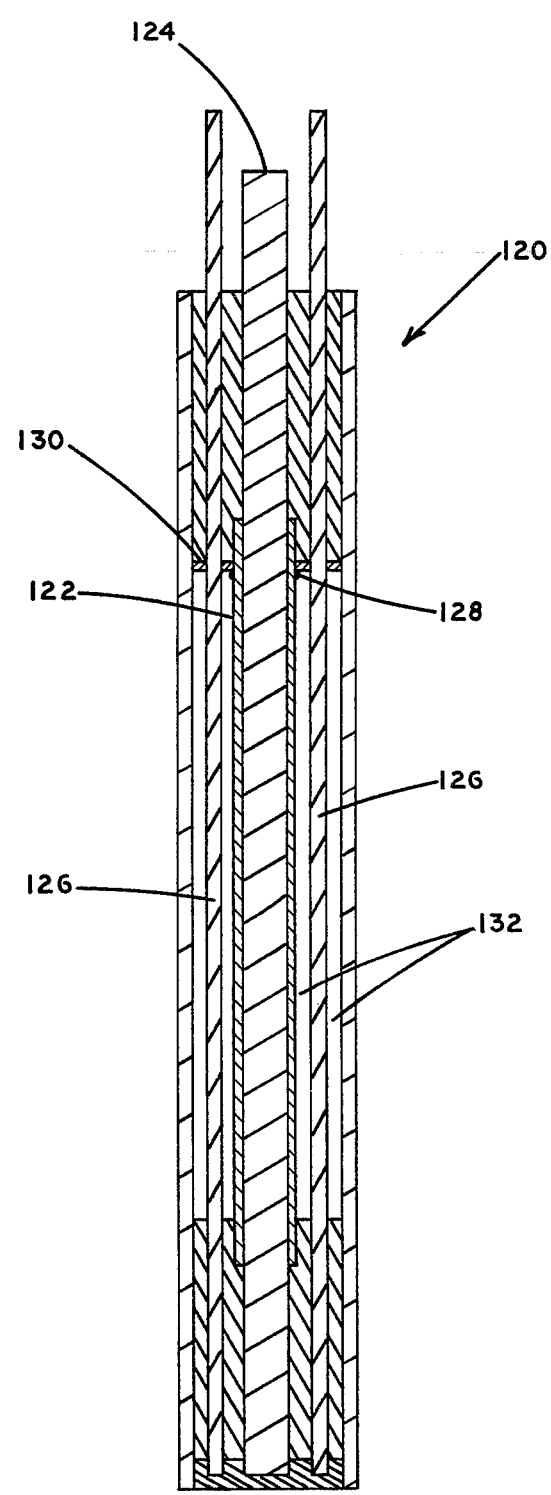
FIG. 9 is a cross-sectional view of another means of constructing a hybrid heat pipe.

FIG. 9 depicts an alternate embodiment of the apparatus for constructing a hybrid heat pipe. Assembly 120 is there assembled in a similar manner to assembly 88 in FIG. 8. However, vapor tube 122 is slipped over vapor space mandrel 124 rather than placing liquid conduits around tunnel mandrels 126. Shoulders 128 on the outside surface of vapor tube 122 are then used to support powder retaining disc 130. The other features of construction are the same as that shown in FIG. 8. When construction is complete, the embodiment in FIG. 9 operates with vapor traveling through the center core of vapor tube 122, while liquid travels in the spaces 132 around the outside of vapor tube 122.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

Figure 7:
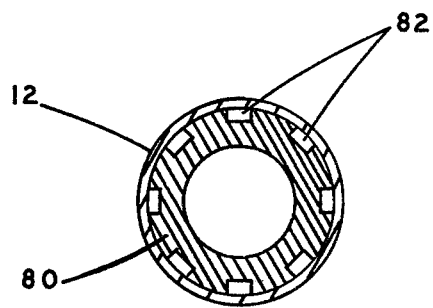
FIG. 7 is a sectional view similar to FIG. 2, of a heat pipe with an alternate configuration of tunnels.

For example, the method of this invention is applicable to a range of materials, wick geometries and fixturing without deviating from the basic principles of forming a tunnel wick structure by sintering of powder in shapes pre-determined by appropriate forming fixtures, and the powder may be metallic or non-metallic. Moreover, as shown in FIG. 7, wick 80 can also be formed with rectangular shaped tunnels 82 in direct contact with outer casing 12.

I claim:

1. A method of fabricating a heat pipe with a sintered wick containing liquid flow tunnels comprising:
   providing a first non-bonding base fixture capable of retaining a longitudinal section of heat pipe casing and a vapor space mandrel oriented so that between them there is clearance space from the outer surface of the vapor space mandrel to the inner surface of the casing;
   providing retaining means within the clearance space between the vapor space mandrel and the casing to hold rods of the size of the desired liquid flow tunnels;
   placing a longitudinal section of heat pipe casing and a non-bonding vapor space mandrel into the first base fixture to form a clearance space in the shape of and equal to the desired thickness of the sintered metal wick;
   placing non-bonding rods, of size appropriate to define the desired liquid flow tunnels, into the retaining means in such a manner that the rods are oriented in that position in which the liquid flow tunnels are desired to be formed;
   filling the balance of the clearance space with powder capable of being sintered;
   heating the entire assembly of parts to a temperature, for a time, and in an atmosphere suitable for sintering the powder into a rigid wick structure;
   removing the rods from the assembly of parts leaving longitudinal tunnels with open ends in the wick structure;
   removing the vapor space mandrel from the assembly of parts;
   removing the casing with the sintered wick structure bonded to it from the first base fixture; and
   completing the assembly of the heat pipe with end caps and a closure tube by conventional heat pipe construction techniques and evacuating and filling the heat pipe with liquid by conventional methods.

2. A method of fabricating a heat pipe with a sintered wick containing liquid flow tunnels as in claim 1 comprising the further steps, before the step of completing the assembly, of:
   providing end parts of a size to cover the open ends of the longitudinal tunnels;
   providing a second non-bonding base fixture capable of holding the casing with sintered wick structure and also holding the sintered end parts in a position covering the ends of the longitudinal tunnels;
   placing the casing with sintered wick structure in the second base fixture;
   placing the end parts against the ends of the longitudinal tunnels and holding them in place by use of the second base fixture;
   heating the entire assembly of parts to a temperature, for a time, and in an atmosphere suitable for sintering the end parts to the wick structure; and removing the assembled parts from the second base fixture.

3. A method of fabricating a heat pipe with sintered metal wick containing liquid flow tunnels as in claim 2 comprising the further step of coating the ends of the sintered wick structure with sintering powder before placing the end parts into the assembly.

4. A method of fabricating a heat pipe with a sintered metal wick containing liquid flow tunnels as in claim 3 comprising the further step of preparing the sintered powder into a slurry before coating the ends of the sintered wick structure with it.

5. A method of making a heat pipe with active heat pipe sections connected by at least one conventional pipe comprising: partially encasing the ends of the pipe with sintering powder formed into a conventional wick configuration; forming liquid flow tunnels adjacent to the ends of the conventional pipe by placing non-bonding removable members within the sintering powder and protruding beyond the ends of the sintering powder to form liquid flow tunnels within the wick structure; sintering the powder into a rigid structure; and removing the removable members after the sintering operation.

* * * * *